United States Patent
Bouwer

(10) Patent No.: US 9,902,496 B2
(45) Date of Patent: Feb. 27, 2018

(54) MULTI-DIRECTIONAL ELASTOMERIC DAMPENED BALL JOINT ASSEMBLY

(71) Applicant: The Boeing Company, Chicago, IL (US)

(72) Inventor: Scott Hendrik Bouwer, Wilmington, DE (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 15/273,542

(22) Filed: Sep. 22, 2016

(65) Prior Publication Data

US 2017/0233074 A1    Aug. 17, 2017

Related U.S. Application Data

(62) Division of application No. 13/749,495, filed on Jan. 24, 2013, now Pat. No. 9,458,877.

(51) Int. Cl.
| | |
|---|---|
| B64D 1/22 | (2006.01) |
| F16C 11/08 | (2006.01) |
| F16C 11/06 | (2006.01) |
| F16F 1/40 | (2006.01) |
| B64C 27/22 | (2006.01) |

(52) U.S. Cl.
CPC ............ B64D 1/22 (2013.01); B64C 27/22 (2013.01); F16C 11/0695 (2013.01); F16C 11/083 (2013.01); F16F 1/406 (2013.01)

(58) Field of Classification Search
CPC ..... Y10T 403/32713; Y10T 403/32721; Y10T 403/32729; F16C 11/06; F16C 11/08; F16C 11/083; B64D 1/22
See application file for complete search history.

(56) References Cited

U.S. PATENT DOCUMENTS

| | | | | |
|---|---|---|---|---|
| 2,721,044 A | * | 10/1955 | Young | B64C 37/02 244/2 |
| 2,885,248 A | | 5/1959 | White | |
| 3,008,665 A | * | 11/1961 | Piasecki | B64B 1/00 244/2 |
| 3,656,723 A | * | 4/1972 | Piasecki | B64C 27/12 244/2 |
| 3,778,189 A | | 12/1973 | Ferris | |
| 3,862,812 A | | 1/1975 | Gorndt et al. | |
| 4,439,055 A | | 3/1984 | Quigg et al. | |
| 4,533,274 A | | 8/1985 | Moore | |
| 4,895,354 A | | 1/1990 | Byrnes | |

(Continued)

OTHER PUBLICATIONS

International Search Report and Written Opinion, dated Mar. 21, 2014, regarding Application No. PCT/US2013/075249, 7 pages.

(Continued)

*Primary Examiner* — Jonathan Masinick
(74) *Attorney, Agent, or Firm* — Yee & Associates, P.C.

(57) ABSTRACT

A method and apparatus for reducing a force. An apparatus comprises a multi-directional joint assembly and a damper associated with the multi-directional joint assembly. The multi-directional joint assembly has a first end and a second end. The first end and the second end move relative to each other. The damper is comprised of a number of elastomeric layers and a number of rigid layers interspersed with each other reducing at least one of a force and a moment.

21 Claims, 14 Drawing Sheets

(56) References Cited

U.S. PATENT DOCUMENTS

| | | | |
|---|---|---|---|
| 5,601,408 | A | 2/1997 | Hunter et al. |
| 5,951,061 | A | 9/1999 | Artt, III et al. |
| 7,097,169 | B2 | 8/2006 | Mueller |
| 8,016,324 | B2 | 9/2011 | Gutierrez-Lemini et al. |
| 8,038,177 | B2 | 10/2011 | Gutierrez-Lemini et al. |
| 9,458,877 | B2 | 10/2016 | Bouwer |
| 2009/0268997 | A1 | 10/2009 | Cunningham et al. |
| 2014/0205364 | A1 | 7/2014 | Bouwer |

OTHER PUBLICATIONS

International Preliminary Report on Patentability, dated Jul. 28, 2015, regarding Application No. PCT/US2013/075249, 4 pages.
Office Action, dated Dec. 29, 2014, regarding U.S. Appl. No. 13/749,495, 24 pages.
Final Office Action, dated Jun. 12, 2015, regarding U.S. Appl. No. 13/749,495, 9 pages.
Office Action, dated Oct. 22, 2015, regarding U.S. Appl. No. 13/749,495, 10 pages.
Notice of Allowance, dated Apr. 11, 2016, regarding U.S. Appl. No. 13/749,495, 11 pages.

* cited by examiner

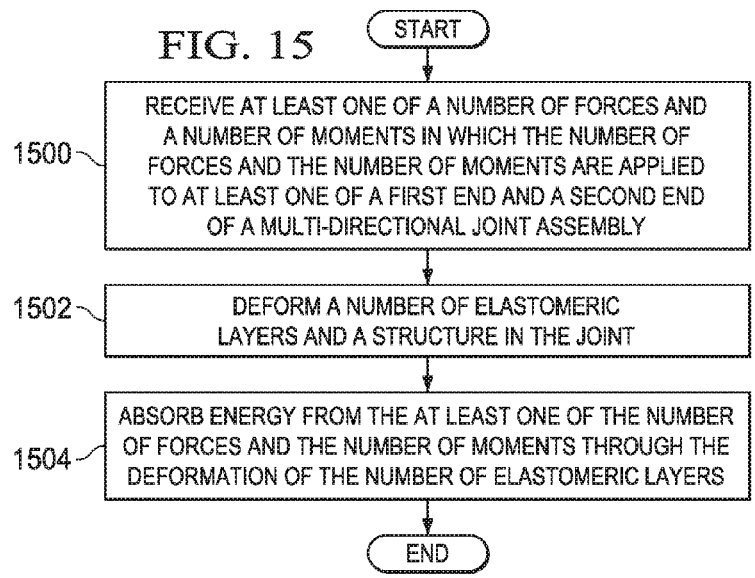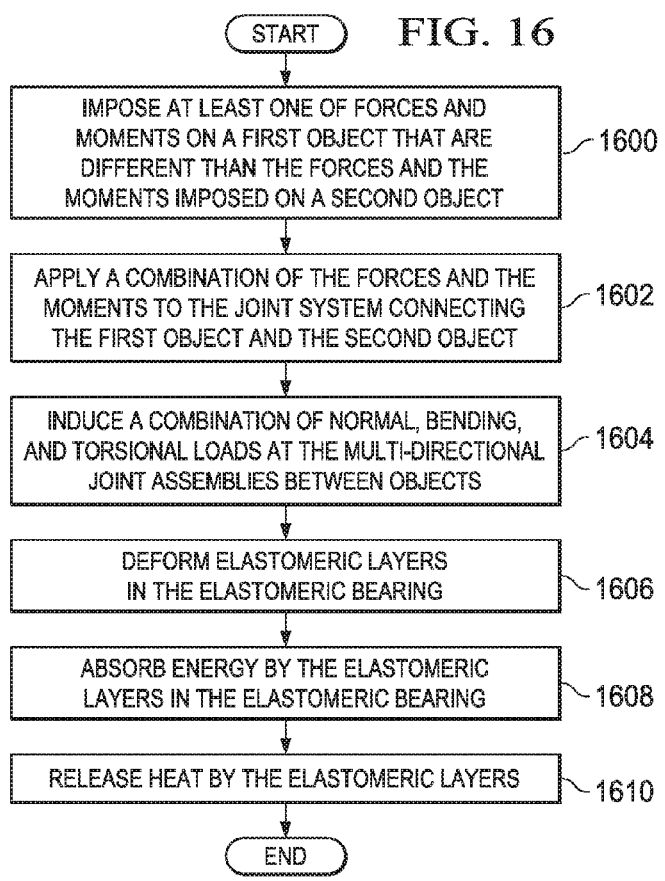

MULTI-DIRECTIONAL ELASTOMERIC DAMPENED BALL JOINT ASSEMBLY

CROSS-REFERENCE TO RELATED APPLICATION(S)

This application is a divisional of and claims the benefit of priority to U.S. patent application Ser. No. 13/749,495, filed Jan. 24, 2013, the entire contents of which are incorporated herein by referenced.

BACKGROUND INFORMATION

1. Field

The present disclosure relates generally to structures and, in particular, to structures carrying loads. Still more particularly, the present disclosure relates to a method and apparatus for carrying loads while allowing controlled displacement of the structures carrying the loads.

2. Background

With mechanical systems, different objects may be connected to each other. For example, a bridge may have towers, parts of a deck, suspension cables, and other components that are connected to each other. In some cases, the connection between objects may allow for movement, expansion, or contraction of the objects. The point of connection of two or more objects is a joint. In some cases, joints connecting two objects together may be multi-directional joints that allow movement in more than one direction.

When objects are connected to each other, dampers may be used. A damper is a physical structure connected to the objects. When a load is carried through the damper, the damper allows a controlled amount of deflection in at least one direction which reduces any force applied in that direction. In other words, a damper may arrest movement in certain directions but allow deflection and reduced loads in other directions. This process constrains relative motion between the objects in response to applied loads and forces while reducing the forces carried through the system in the directions that are able to deflect.

A damper, used with a load bearing joint, may constrain the relative motion between objects to only a few degrees of freedom. For example, a hydraulic damper, such as an automotive shock absorber, may be used to allow one-dimensional movement of a point along a line. In another example, a cylindrical elastomeric bearing may accommodate rotation about a fixed axis.

A damper may limit motion to certain degrees of freedom using a design that reduces deflection to certain directions. For example, an elastomeric bearing is comprised of layers of a deformable elastomer material and layers of a rigid material. As used herein, "rigid" material is material that does not have deflection. The rigid layers may be placed between elastomeric layers such that the rigid layers slide with resistance relative to each other but the separation or compression of the rigid layers is prevented by the stacking of the elastomeric material in thin layers between the rigid layers.

Different types of dampers are used in different situations, depending on the desired degrees of freedom of the objects and the types of loads to be applied to the objects. For example, an elastomeric bearing may be used between two parts of a deck in a bridge such that these parts may expand or contract in response to changes in temperature. As another example, an elastomeric bearing may be used in a rotor assembly for a helicopter to absorb energy from dynamic loads and vibrations from rotor blades.

The elastomeric bearing used in one situation may not function as well as desired in another situation. For example, the loads and force directions that are encountered by an elastomeric bearing used in a bridge may be very different from the loads and force directions encountered by an elastomeric bearing used in a rotor assembly for a helicopter. As a result, the desired geometry, quantity, and thickness of layers within an elastomeric bearing for one application may differ from the desired geometry, quantity, and thickness of layers for other applications.

Thus, as new applications using elastomeric bearings are implemented, new bearing designs are developed to provide a level of resistance that reduces the amount of deflection to a level desired for the new application. Therefore, it would be desirable to have a method and apparatus that takes into account at least some of the issues discussed above, as well as other possible issues.

SUMMARY

In one illustrative configuration, an apparatus comprises a multi-directional joint assembly and a damper. The multi-directional joint assembly has a first end and a second end. The first end and the second end move relative to each other. The damper is comprised of a number of elastomeric layers and a number of rigid layers interspersed with each other.

In another illustrative configuration, a multi-directional elastomeric dampened ball joint assembly comprises a ball, a socket, and a hemispherical elastomeric bearing. The ball is associated with a first end of the multi-directional elastomeric dampened ball joint assembly. The socket is associated with a second end of the multi-directional elastomeric dampened ball joint assembly. The ball is moveably held in a cavity in the socket. The hemispherical elastomeric bearing has alternating rigid layers and elastomeric layers. The outer surface of the hemispherical elastomeric bearing is associated with an inner surface of an enclosure. The inner surface of the hemispherical elastomeric bearing is associated with an outer surface of the socket. The hemispherical elastomeric bearing absorbs energy and reduces at least one of a force and a moment applied to at least one of the first end and the second end.

In yet another illustrative configuration, a method for reducing a force is provided. At least one of a number of forces and a number of moments is applied to at least one of a first end and a second end of a multi-directional joint assembly is received. The first end and the second end move relative to each other. A number of elastomeric layers in a damper associated with the multi-directional joint assembly are deformed. The damper comprises the number of elastomeric layers and a number of rigid layers interspersed with each other.

The features and functions can be achieved independently in various configurations of the present disclosure or may be combined in yet other configurations in which further details can be seen with reference to the following description and drawings.

BRIEF DESCRIPTION OF THE DRAWINGS

The novel features believed characteristic of the illustrative configurations are set forth in the appended claims. The illustrative configurations, however, as well as a preferred mode of use, further objectives and features thereof, will best be understood by reference to the following detailed description of an illustrative configuration of the present disclosure when read in conjunction with the accompanying drawings, wherein:

FIG. 15 is an illustration of a flowchart of a process for absorbing a force in accordance with an illustrative configuration; and FIG. 16 is another illustration of a flowchart of a process for absorbing a force in accordance with an illustrative configuration.

DETAILED DESCRIPTION

Figure 1:
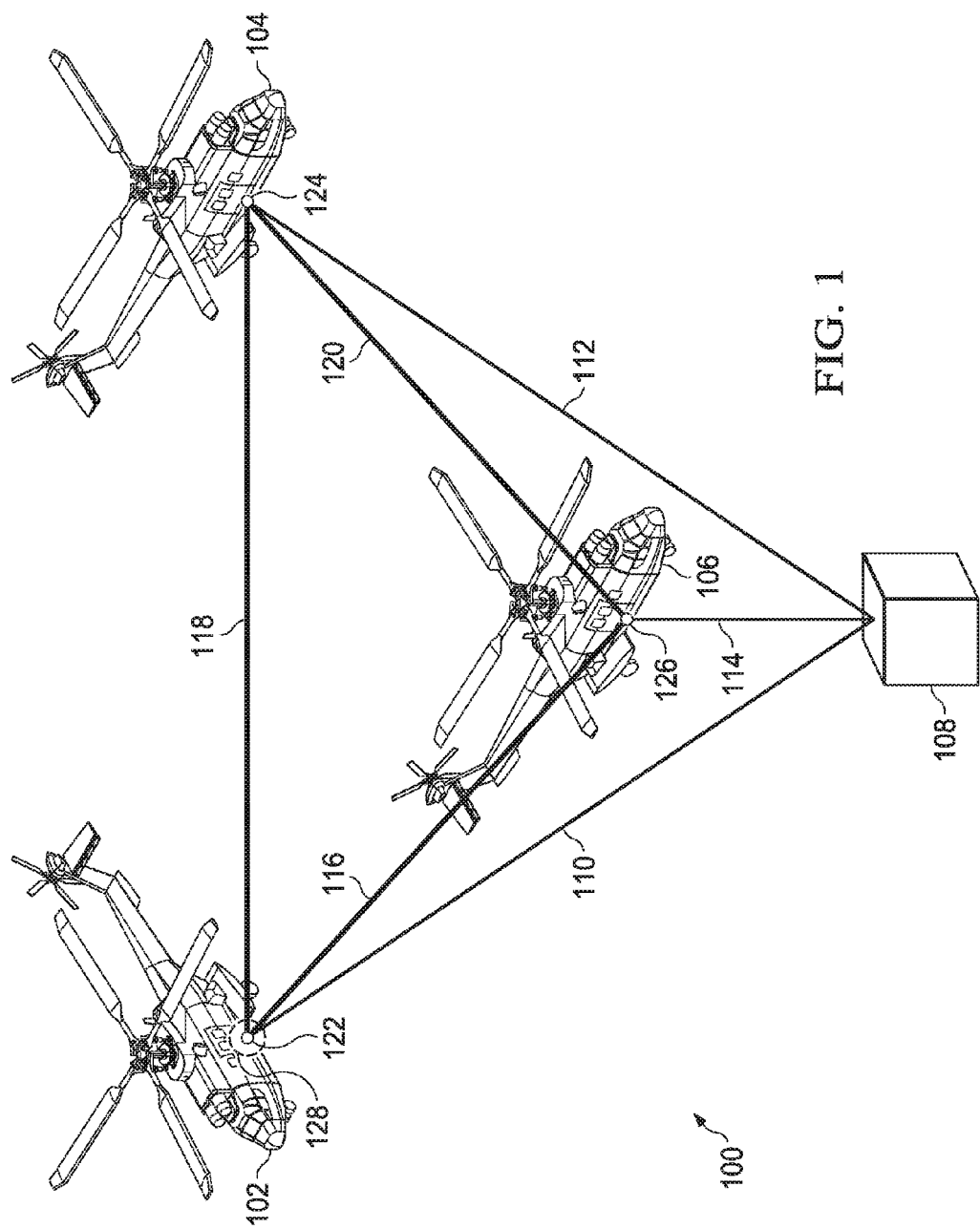
FIG. 1 is an illustration of a load environment in accordance with an illustrative configuration.

The illustrative configurations recognize and take into account one or more different considerations. For example, the illustrative configurations recognize and take into account that in some cases, it may be desirable to maintain a relative position between two objects within desired tolerances.

The illustrative configurations recognize and take into account that a spacing structure such as a beam may be used to maintain a desired distance between the two objects. The desired distance may be a required distance for the operation of the two objects or may be based on other considerations, depending on the particular implementation. The beam may be used to connect two objects to each other to ensure the required distance between the two objects is maintained while allowing relative movements within desired tolerances. For example, the beam may be connected to the objects such that relative movement up, down, left, and right occurs within desired tolerances. Similarly, the connection may also allow rotational movement within desired tolerances. Rotational movement is also known as torsional movement in these illustrative examples.

The illustrative configurations also recognize and take into account that a joint may be designed to limit degrees of freedom with respect to the movement of the objects relative to each other. When the type of movement that is provided, limited, or provided and limited includes angular and rotational movement, the joint may take the form of a multi-directional joint assembly. When the type of movement that is provided, limited, or provided and limited includes angular movement only, the joint may take the form of a U-joint.

Additionally, the illustrative configurations recognize and take into account that movement of the two objects relative to each other may result in different types of forces being applied to the two objects connected to each other with a beam. For example, these forces may include one or more of a torsional force, a bending force, and a normal force. In these illustrative examples, a normal force may be a tension force or a compression force.

The illustrative configurations also recognize and take into account that deflection may be desired to reduce loads at the joint between the beam and the objects, where bending forces are highest. This type of movement may be facilitated using a multi-directional joint assembly with a damper. This damper deforms and reduces the load. In particular, the joints between objects may include a damper in the form of an elastomeric bearing.

Moreover, the illustrative configurations recognize and take into account that elastomeric bearings are well suited as dampers when loads occur simultaneously in different situations. In this case, joints may take the form of ball joints. A ball joint with an elastomeric bearing may be used to carry normal force through the ball joint to maintain a desired distance between objects while still allowing bending or torsional deflection within desired tolerances.

The illustrative configurations also recognize and take into account that an elastomeric bearing includes several layers of an elastomer that deform under a load. This deformation results in relative movement of the objects attached to opposite sides of the elastomeric bearing. The elastomer is a polymeric material. When a load is applied to the polymeric material, the polymeric material deforms in shear. When the load is removed, the polymeric material returns to substantially its original shape. In other words, the polymeric material returns to its original shape within selected tolerances. As used herein, "shear" stress is stress which is applied parallel or tangential to a face of a material.

With reference now to the figures and, in particular, with reference to FIG. 1, an illustration of a load environment is depicted in accordance with an illustrative configuration. As depicted, load environment 100 includes helicopter 102, helicopter 104, and helicopter 106. Helicopter 102, helicopter 104, and helicopter 106 move object 108. Object 108 may take various forms. For example, object 108 may be a container, a vehicle, a payload, or some other suitable type of object.

As depicted, object 108 is connected to helicopter 102, helicopter 104, and helicopter 106 by the line 110, line 112, and line 114, respectively. In this example, the weight of object 108 may pull helicopter 102, helicopter 104, and helicopter 106 toward each other during flight. As a result, spacing is maintained between helicopter 102, helicopter 104, and helicopter 106 using beam 116, beam 118, and beam 120. In these illustrative examples, beam 116 is connected to helicopter 102 and helicopter 106, beam 118 is connected to helicopter 102 and helicopter 104, and beam 120 is connected to helicopter 104 and helicopter 106.

The connections of beam 116, beam 118, and beam 120 to helicopter 102, helicopter 104, and helicopter 106 may be made using joint system 122, joint system 124, and joint system 126. Each joint system comprises a number of joint assemblies. In these illustrative examples, a joint system may comprise two joint assemblies with each joint assembly connecting a helicopter to a beam. Within each joint assembly, a multidirectional joint and a damper may be present.

As depicted, joint system 122 is associated with helicopter 102, beam 116, and beam 118. In other words, a first joint in joint system 122 connects helicopter 102 with beam 116 and a second joint connects helicopter 102 with beam 118. Similarly, joint system 124 is associated with helicopter 104, beam 118, and beam 120. Joint system 126 is associated with helicopter 106, beam 120, and beam 116.

When one component is "associated" with another component, the association is a physical connection in these depicted examples. For example, a first component, a joint in joint system 122, may be considered to be associated with a second component, helicopter 102, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or as an extension of the second component.

With this configuration of helicopter 102, helicopter 104, and helicopter 106, many different forces may occur while carrying object 108. In this depicted example, the forces include horizontal forces that pull helicopter 102, helicopter 104, and helicopter 106 toward each other. These forces may be reacted by compressive loads carried through beam 116, beam 118, and beam 120. For example, a force pulling helicopter 102 toward helicopter 104 results in a compressive load being reacted through beam 118 in these illustrative examples.

The compressive forces within one or more of beam 116, beam 118, and beam 120 also may be introduced into the airframe of one or more of helicopter 102, helicopter 104, and helicopter 106 using various mechanisms. For example, a fixed joint, a flexible beam, a hydraulic actuator, a multi-directional joint, or other suitable types of mechanisms may be used.

In one example, joint system 122, joint system 124, and joint system 126 may be fixed joint systems. This type of joint system, however, may not provide a desired amount of movement between helicopter 102, helicopter 104, and helicopter 106 relative to each other. Without relative movement between helicopter 102, helicopter 104, and helicopter 106, the fixed joint system will induce bending loads, torsional loads, or both to be reacted at joint system 122, joint system 124, and joint system 126. These loads may be undesirable in these illustrative examples.

In another example, beam 116, beam 118, and beam 120 may be designed to allow for deflection. This type of beam design, however, limits the deflection properties of the system to the material and geometry selected for beam 116, beam 118, and beam 120. In other words, the material and geometry selected for beam 116, beam 118, and beam 120 determines the maximum amount of deflection possible for the system. Further, designing beam 116, beam 118, and beam 120 to allow deflection may compromise the compressive load capability of the beams, increase beam weight, or both. Additionally, the selection of a flexible material for beam 116, beam 118, and beam 120 does not directly address bending loads at the joints where the bending force is highest. Thus, designing beam 116, beam 118, and beam 120 to allow for deflection may be undesired in these illustrative examples.

In yet another example, hydraulic actuators may be used in joint system 122, joint system 124, and joint system 126. Hydraulic actuators, however, may not provide movement in as many directions as desired. For example, because hydraulic actuators are linear acting, joint system 122, joint system 124, and joint system 126 would require additional support structures with multiple hydraulic actuators to accommodate various degrees of freedom. As a result, the use of multiple hydraulic actuators to provide movement in a desired number of directions may increase system complexity and cost.

In this illustrative example, joint system 122, joint system 124, and joint system 126 each have joints that allow for movement in a desired number of directions. An illustrative configuration may be implemented in joint system 122, joint system 124, and joint system 126. In particular, joint system 122, joint system 124, and joint system 126 may employ multi-directional joints such as ball joints. A more detailed illustration of joint system 122 in section 128 is shown and described with respect to FIG. 3, below.

In these illustrative examples, an illustrative configuration may be implemented in one or more of joint system 122, joint system 124, and joint system 126 to maintain the movement of a beam and a helicopter relative to each other within a desired tolerance. For example, an illustrative configuration may be implemented in joint system 122 to maintain movement of beam 116 relative to helicopter 102 within a desired tolerance of five feet. Of course, the desired tolerance may be any distance, depending on the particular implementation.

Further, an illustrative configuration may be implemented in joint system 122, joint system 124, and joint system 126 to reduce a force, absorb the force, dampen the force, or some combination thereof with respect to forces that may be applied to joint system 122, joint system 124, and joint system 126 during operation of helicopter 102, helicopter 104, and helicopter 106. Moreover, an illustrative configuration may be implemented in joint system 122, joint system 124, and joint system 126 to reduce a moment, absorb the moment, dampen the moment, or some combination thereof with respect to moments that may be applied to joint system 122, joint system 124, and joint system 126. As used herein a "moment" is a force acting over a distance.

For example, an illustrative configuration may include an apparatus that may be implemented in at least one of joint system 122, joint system 124, and joint system 126. In one or more illustrative configurations, an apparatus comprises a multi-directional joint assembly and a damper. The multi-directional joint assembly has a first end and a second end. The first end and the second end move relative to each other. The damper is associated with the multi-directional joint assembly. The damper is comprised of a number of rigid layers and a number of elastomeric layers interspersed with each other. As used herein, a "number of," when used with reference to items, means one or more items. For example, a number of rigid layers is one or more rigid layers.

Figure 2:
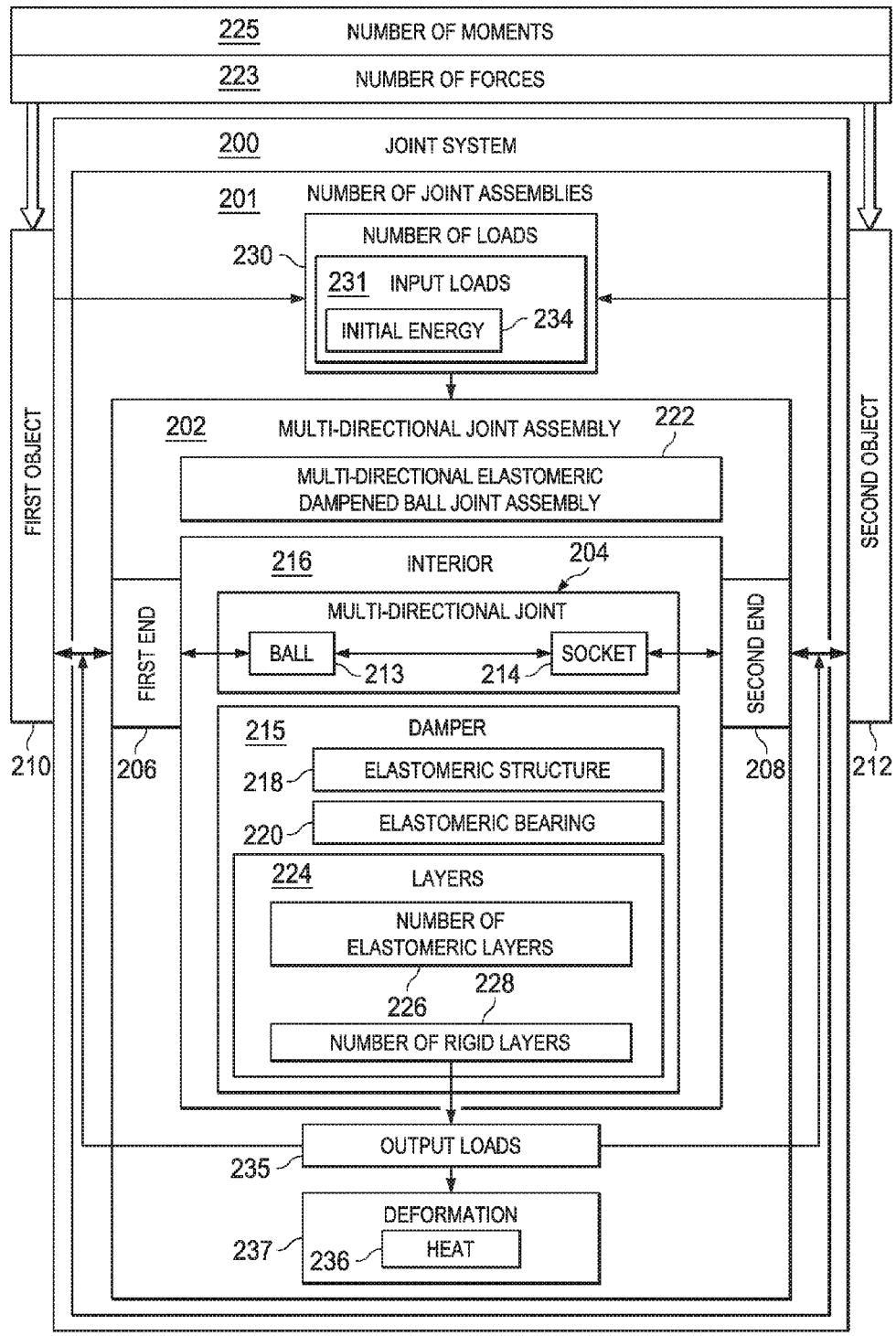
FIG. 2 is an illustration of a block diagram of a joint system in accordance with an illustrative configuration.

Turning next to FIG. 2, an illustration of a block diagram of a joint system is depicted in accordance with an illustrative configuration. Joint system 200 is an example of a joint system that may be used to implement at least one of joint system 122, joint system 124, and joint system 126 in load environment 100 in FIG. 1.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C. In other examples, "at least one of" may be, for example, without limitation, two of item A, one of item B, and ten of item C; four of item B and seven of item C; and other suitable combinations.

As depicted, joint system 200 includes number of joint assemblies 201. Multi-directional joint assembly 202 is a joint assembly in number of joint assemblies 201 in which an illustrative configuration may be implemented. In particular, multi-directional joint assembly 202 may include multi-directional joint 204 and damper 215. In these illustrative examples, multi-directional joint 204 may be a ball joint. Of course, multi-directional joint assembly 202 may comprise other types of multi-directional joints other than a ball joint, depending on the particular implementation.

In this illustrative example, multi-directional joint assembly 202 has first end 206 and second end 208. First end 206 is connected to first object 210, while second end 208 is connected to second object 212. For example, first end 206 may be connected to beam 116 and second end 208 may be connected to a rotorcraft such as helicopter 102 in FIG. 1.

As depicted, first object 210 and second object 212 may take different forms depending on the particular implementation. In one illustrative example, first object 210 may be beam 116, while second object 212 may be helicopter 102.

As used herein, a first component that is "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

As depicted, multi-directional joint 204 has ball 213 and socket 214. First end 206 of multi-directional joint assembly 202 is associated with ball 213 of multi-directional joint 204 and second end 208 of multi-directional joint assembly 202 is associated with socket 214 of multi-directional joint 204. As depicted, ball 213 and socket 214 are physical structures. Socket 214 holds ball 213.

Further, multi-directional joint assembly 202 also includes damper 215 within interior 216 of multi-directional joint assembly 202. In this illustrative example, damper 215 is elastomeric structure 218. In particular, damper 215 may be elastomeric bearing 220.

Still more particularly, multi-directional joint assembly 202 may take the form of multi-directional elastomeric dampened ball joint assembly 222. In this form, multi-directional elastomeric dampened ball joint assembly 222 may aid in the absorption of number of forces 223. Number of forces 223 may include, for example, at least one of a torsional force, a compressive force, a bending force, a tension force, and other suitable types of forces. In this example, multi-directional elastomeric dampened ball joint assembly 222 may dampen number of forces 223. This dampening may include reducing vibrations in some instances.

In this illustrative example, damper 215 is comprised of layers 224. In particular, layers 224 may include number of elastomeric layers 226 and number of rigid layers 228.

In the illustrative example, number of elastomeric layers 226 and number of rigid layers 228 are interspersed with each other. In other words, layers 224 may alternate between an elastomeric layer and a rigid layer. In yet another illustrative example, layers 224 may have two elastomeric layers and three rigid layers. The manner in which layers 224 alternate between different types of layers may vary depending on the particular implementation.

An elastomeric layer in number of elastomeric layers 226 is a layer that deforms in response to number of loads 230. Number of loads 230 may be input loads 231. As depicted, number of loads 230 may be a force applied to damper 215 from other components in multi-directional joint assembly 202.

When number of loads 230 is reduced or removed to a sufficient level, the elastomeric layer in number of elastomeric layers 226 may substantially return to its original shape. In other words, the elastomeric layer in number of elastomeric layers 226 may return to its original shape within selected tolerances.

In these depicted examples, an elastomeric layer may be, for example, a polymer. The polymer may have a viscoelasticity that has a desired Young's modulus and a desired yield strain. The desired Young's modulus may be low and the desired yield strain may be high compared to other materials in damper 215 such as a rigid layer in number of rigid layers 228.

In these illustrative examples, number of elastomeric layers 226 may be comprised of a number of materials with a desired viscoelasticity. The number of materials may be selected from at least one of neoprene, rubber, an elastic polymer, a thermoplastic elastomer, synthetic polyisoprene, polybutadiene, ethylene-vinyl acetate, chlorosulfonated polyethylene, and other suitable materials.

A rigid layer may not have the same properties found in an elastomeric layer. A rigid layer is configured with a low Young's modulus to force the deflection to take place in elastomeric layers only. By stacking alternating rigid layers and elastomeric layers, material deformation of elastomeric layers in response to normal forces is arrested as a result of the neighboring rigid layers which limit flow of deformed material. As a result, deformation occurs in response to shear loads only since deflection in response to normal forces is arrested by rigid layers.

In these illustrative examples, number of rigid layers 228 also may be comprised of a number of materials. The number of materials selected for number of rigid layers 228 may be selected from a metal such as, for example, without limitation, aluminum, steel, titanium, or other suitable materials.

The thicknesses used for number of elastomeric layers 226 and number of rigid layers 228 in layers 224 may vary depending on the amount of elastomeric bearing movement that may be desired for a given input load. In other words, if a larger amount of movement for elastomeric bearing 220 is desired, an increased quantity, thickness, or both for number of elastomeric layers 226 may be used. Conversely, if little movement of elastomeric bearing 220 is desired, a decreased quantity, thickness, or both for number of elastomeric layers 226 may be used. Increasing or decreasing the Young's modulus of the elastomeric material will also increase or decrease the amount of deflection for a given load.

Further, different layers may have different thicknesses within number of elastomeric layers 226, depending on the desired movement of elastomeric bearing 220. In a similar fashion, the number of rigid layers 228 also may have different thicknesses. These thicknesses may be selected such that number of elastomeric layers 226 and number of rigid layers 228 perform as desired.

In these illustrative examples, number of loads 230 may occur in response to at least one of number of forces 223 and number of moments 225 being applied to at least one of first end 206 and second end 208 of multi-directional joint assembly 202. Number of forces 223 may be a single force or may be a combination of forces that may be applied to one or both of first end 206 and second end 208. In these illustrative examples, number of forces 223 may include at least one of a normal force, a reaction force, a portion force, a bending force, and other types of forces. Number of moments 225 may include at least one of torsion, a bending moment, and other types of moments.

In this example, damper 215 carries bending and torsional loads and deflects in these directions. Normal loads from structures connected to multi-directional joint assembly 202 are reacted through multi-directional joint 204.

As depicted in these illustrative examples, damper 215 may absorb energy from number of forces 223 and number of moments 225 applied to multi-directional joint assembly 202. For example, damper 215 absorbs energy from bending and torsional complements comprising number of loads 230. The absorption of initial energy 234 in the deformation of number of elastomeric layers 226 results in heat 236 being released. In other words, number of forces 223 causing number of loads 230 may be reduced by absorbing initial energy 234 in the form of deformation 237 of number of elastomeric layers 226 and releasing heat 236 in these illustrative examples.

Output loads 235 are then carried through first end 206 into first object 210 and through second end 208 into second object 212. Because initial energy 234 is absorbed by number of elastomeric layers 226, output loads 235 are less than input loads 231 in these illustrative examples. In other words, output loads 235 are reduced loads. In this manner, an illustrative configuration may provide a desired level of movement of first object 210 and second object 212 relative to each other while preventing undesired movement of first object 210, second object 212, or both.

The illustration of joint system 200 in FIG. 2 is not meant to imply physical or architectural limitations to the manner in which an illustrative configuration may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative configuration.

For example, additional joint assemblies may be present in addition to multi-directional joint assembly 202. In still other illustrative examples, an additional structure in addition to or in place of damper 215 also may be present within multi-directional joint assembly 202. This additional structure also may absorb loads such as number of loads 230 and generate heat 236 from initial energy 234 in number of loads 230 such that multi-directional joint 204 performs as desired.

Figure 3:
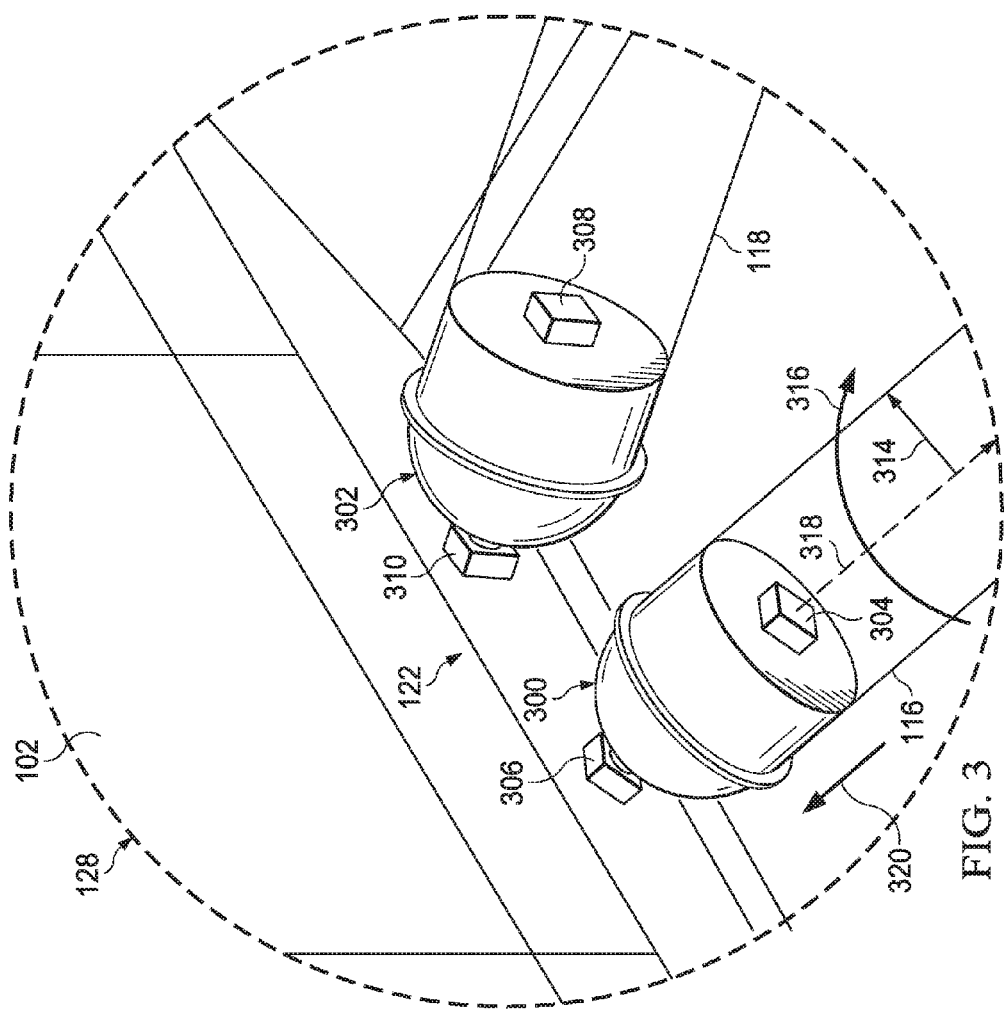
FIG. 3 is a detailed illustration of a joint system in accordance with an illustrative configuration.

With reference now to FIG. 3, a detailed illustration of a joint system is depicted in accordance with an illustrative configuration. In this figure, a more detailed illustration of section 128 in FIG. 1 is shown.

As depicted, joint system 122 includes multi-directional joint assembly 300 and multi-directional joint assembly 302. Multi-directional joint assembly 300 and multi-directional joint assembly 302 are examples of physical implementations for multi-directional joint assembly 202 with multi-directional joint 204 and damper 215 shown in block form in FIG. 2. A multi-directional joint and a damper (not shown) are located within each of multi-directional joint assembly 300 and multi-directional joint assembly 302 in these depicted examples.

In this illustrative example, multi-directional joint assembly 300 has first end 304 and second end 306. First end 304 is associated with beam 116, and second end 306 is associated with helicopter 102. Multi-directional joint assembly 302 has first end 308 and second end 310. First end 308 is associated with beam 118, and second end 310 is associated with helicopter 102.

As depicted, first end 304, second end 306, first end 308, and second end 310 are physical structures. First end 304, second end 306, first end 308, and second end 310 provide locations on multi-directional joint assembly 300 and multi-directional joint assembly 302 that may be associated with other structures.

In this illustration, beam 116 and beam 118 are shown in phantom. This view of beam 116 and beam 118 is provided to illustrate the connection of first end 304 with beam 116 and first end 308 with beam 118.

In these illustrative examples, different forces may occur that apply loads to multi-directional joint assembly 300 or multi-directional joint assembly 302 during the operation of the helicopters carrying object 108 in FIG. 1. For example, a force may be applied in the direction of arrow 314, arrow 316, and arrow 320. Arrow 314 represents a bending force. As another example, arrow 316 represents a torsional force. The torsional force represented by arrow 316 is applied rotationally about axis 318 in this illustrative example. As yet another example, arrow 320 represents an example of a compressive force. This compression force may be applied along axis 318.

This illustration of the different types of forces is depicted to provide an example of some of the types of forces that may be applied to a multi-directional joint assembly in joint system 122. Of course, other types of forces may be applied in addition to or in combination with the forces illustrated in this example.

Figure 4:
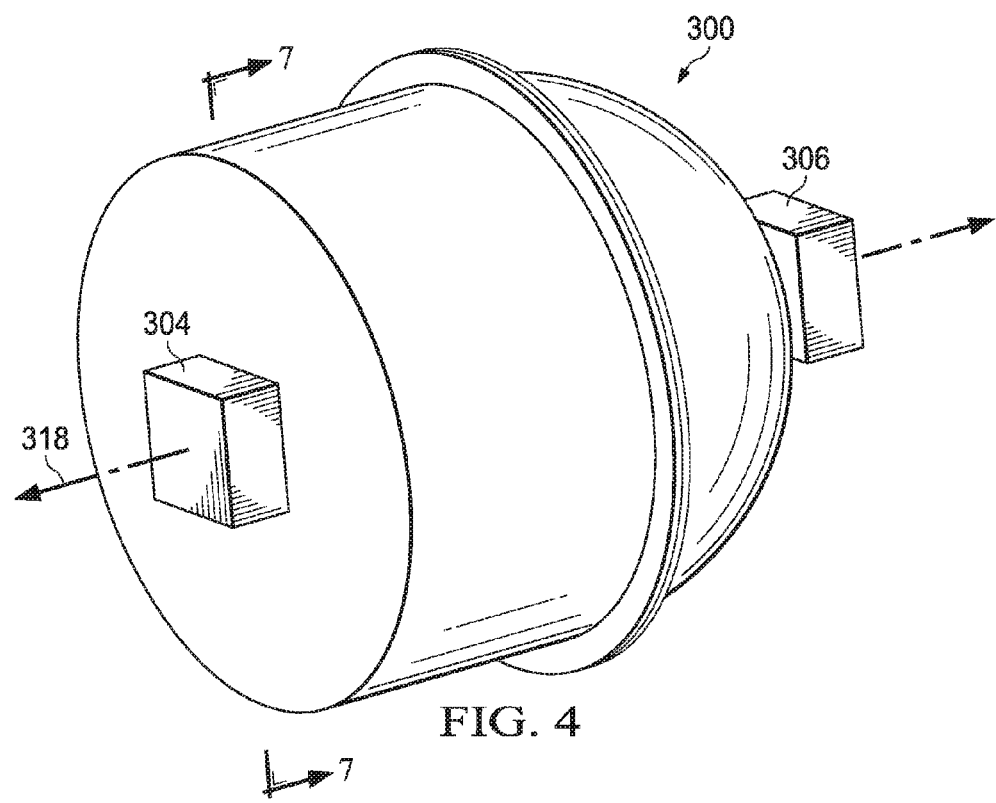
FIG. 4 is an illustration of a multi-directional joint assembly in accordance with an illustrative configuration.

Turning now to FIG. 4, an illustration of a multi-directional joint assembly is depicted in accordance with an illustrative configuration. In this example, a more detailed illustration of multi-directional joint assembly 300 in FIG. 3 is shown in a perspective view.

In this illustration, multi-directional joint assembly 300 is shown without the components that may be associated with or connected to first end 304 and second end 306 of multi-directional joint assembly 300. First end 304 and second end 306 move relative to each other in bending. This movement may also include torsional movement.

Figure 5:
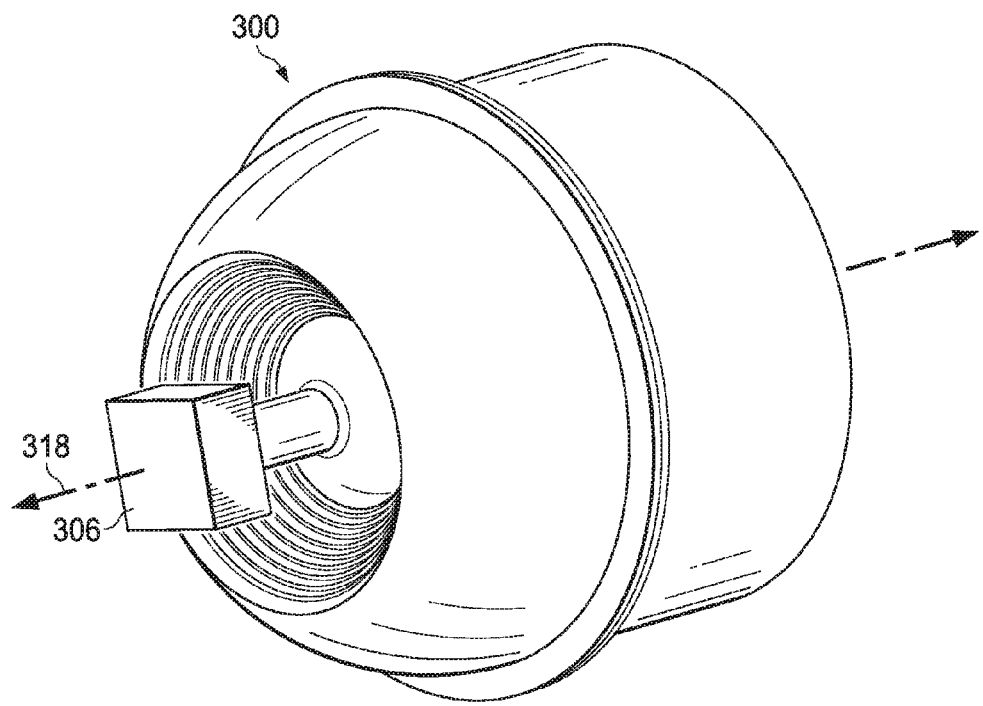
FIG. 5 is another illustration of a multi-directional joint assembly in accordance with an illustrative configuration.

In FIG. 5, another illustration of a multi-directional joint assembly is depicted in accordance with an illustrative configuration. In this figure, another perspective view of multi-directional joint assembly 300 is shown from second end 306.

Figure 6:
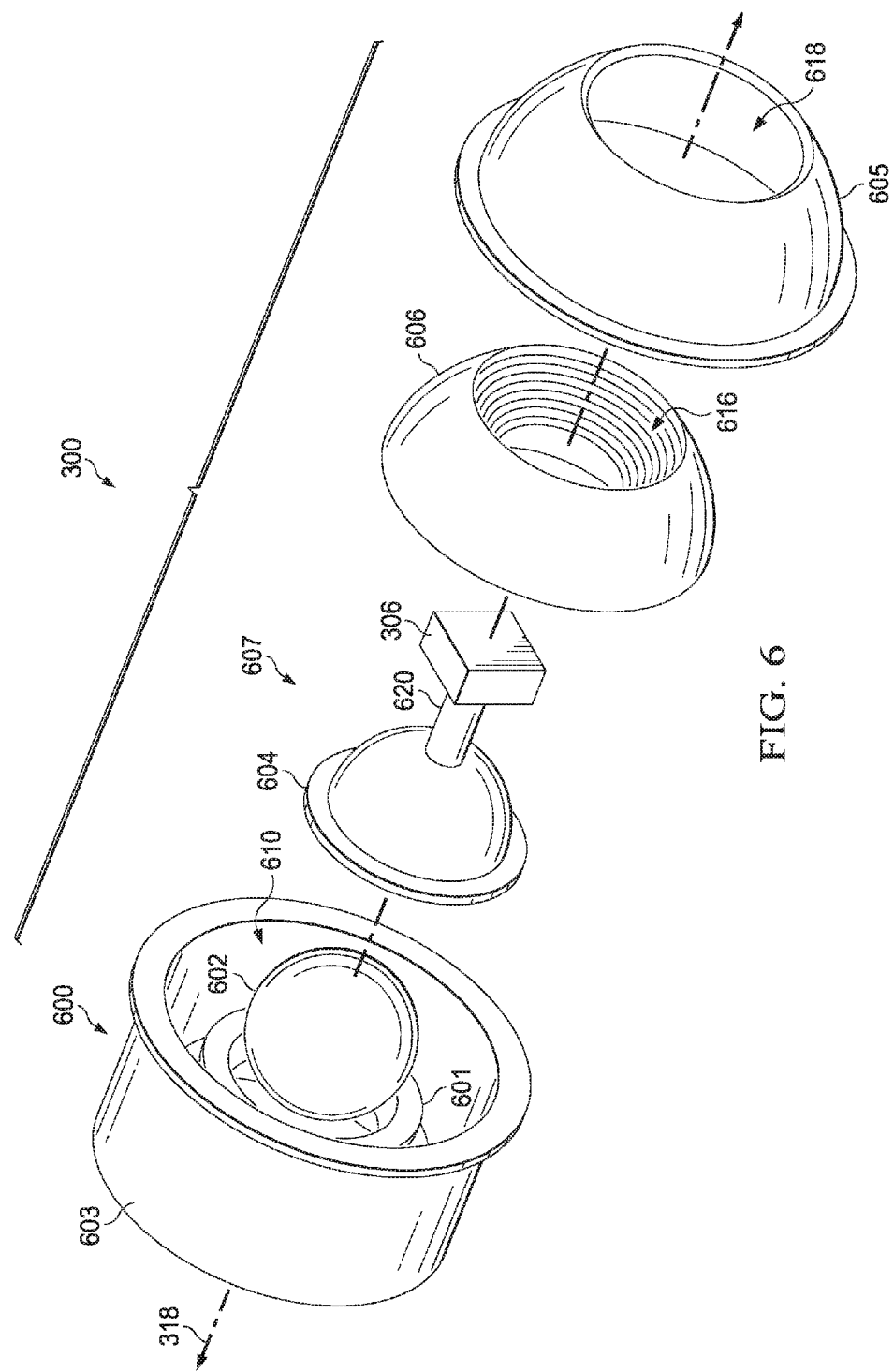
FIG. 6 is an illustration of an exploded view of a multi-directional joint assembly in accordance with an illustrative configuration.

With reference now to FIG. 6, an illustration of an exploded view of a multi-directional joint assembly is depicted in accordance with an illustrative configuration. As can be seen in this exploded view, multi-directional joint assembly 300 includes a number of different components. As depicted, multi-directional joint assembly 300 includes enclosure 600. In this particular example, enclosure 600 is comprised of first portion 603 and second portion 605. Multi-directional joint assembly 300 also includes ring 601, ball 602, socket 604, and elastomeric bearing 606. Ring 601, ball 602, and socket 604 comprise multi-directional joint 607. Multi-directional joint 607 may be one example of an implementation for multi-directional joint 204 shown in block form in FIG. 2.

First portion 603 and second portion 605 of enclosure 600 are physical structures that hold ball 602, socket 604, and elastomeric bearing 606 within interior 610 of enclosure 600. Second portion 605 may be connected to first portion 603 of enclosure 600 of multi-directional joint assembly 300.

As depicted, ball 602 is a physical structure that is associated with first portion 603 of enclosure 600. In these illustrative examples, ball 602 may be formed as part of first portion 603 of enclosure 600 or may be connected to first portion 603 of enclosure 600 within interior 610 of first portion 603 of enclosure 600. Ball 602 has a shape of a sphere in this illustrative example.

In this example, socket 604 receives and hold ball 602. Ring 601 may be connected to socket 604 to retain ball 602 within socket 604. Ring 601 may be connected to socket 604 by being bonded, welded, or otherwise connected to socket 604. In this example, ring 601 may be a frusto-spherical ring. In this example, socket 604 may be a hemispherical socket.

Elastomeric bearing 606 takes a hemispherical form in this illustrative example. In these examples, a hemispherical elastomeric bearing is an elastomeric bearing that is allows movement in multiple degrees of freedom. In other words, elastomeric bearing 606 allows movement in more than one direction.

As illustrated, multi-directional joint assembly 300 is rigid with respect to normal forces, such as compression and tension loads, reacted along axis 318. However, elastomeric bearing 606 reacts bending and torsional forces and enables load reduction in these directions through deflection in bending and torsion. In other words, the multi-directional joint assembly is rigid when reacting compression and tension loads introduced by a beam, but allows the beam to bend up, down, left, right, rotate, or some combination thereof relative to an airframe. This relative motion will be reduced to some amount of movement by the configuration of layers within elastomeric bearing 606. This reduction in the movement may be referred to as a limit to the movement of the beam.

As illustrated, elastomeric bearing 606 has opening 616 and second portion 605 of enclosure 600 has opening 618. As illustrated, opening 618 may be a hole in second portion 605. Opening 616 and opening 618 allows second end 306 to extend through opening 616 and opening 618. As depicted, elongate member 620 associates second end 306 with second portion 605 of enclosure 600. Opening 616 and opening 618 are also allows second end 306 to move in a number of different directions.

In this illustrative example, first portion 603, ball 602, socket 604, second portion 605, and ring 601 may be comprised of a material selected from at least one of a metal, a plastic, a polycarbonate, aluminum, copper, titanium, steel, and other suitable materials. The material selected for first portion 603, ball 602, socket 604, second portion 605, and ring 601 may be one that may withstand the forces, environment, and other conditions that multi-directional joint assembly 300 may be exposed to during use of multi-directional joint assembly 300. Different components may be comprised of different materials.

In this particular example, the elastomeric layers in elastomeric bearing 606 are formed using neoprene. Of course, the material selected for the elastomeric layers may be any material that provides a desired level of viscoelasticity.

Figure 7:
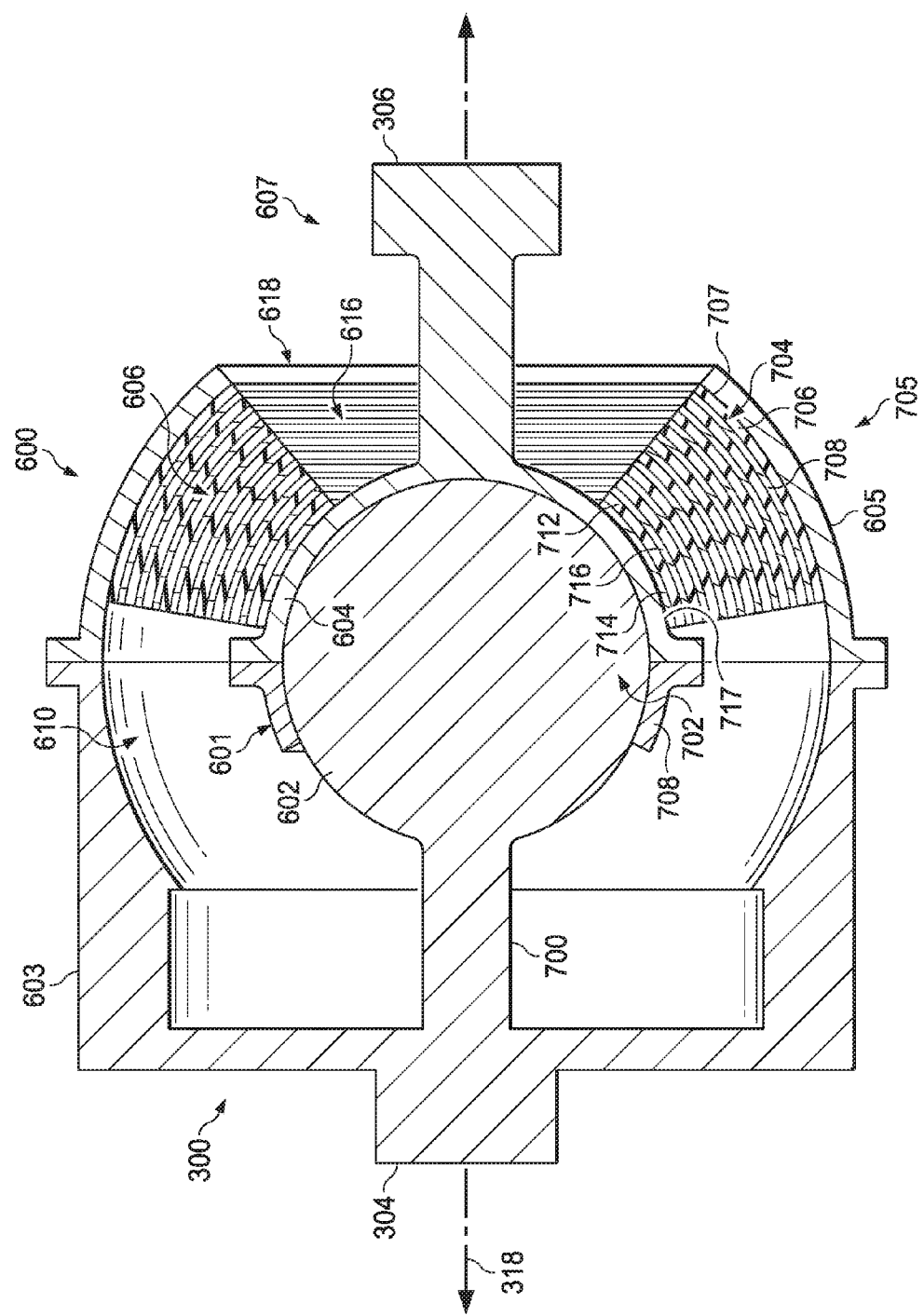
FIG. 7 is an illustration of a cross-sectional view of a multi-directional joint assembly in accordance with an illustrative configuration.

Turning now to FIG. 7, an illustration of a cross-sectional view of a multi-directional joint assembly is depicted in accordance with an illustrative configuration. In this figure, a cross-sectional view of multi-directional joint assembly 300 is shown taken along lines 7-7 in FIG. 4.

In this cross-sectional view, elongate member 700 extends from ball 602 to first end 304. Additionally, ball 602 can be seen as being retained within cavity 702 of socket 604 by ring 601.

As depicted, elastomeric bearing 606 is comprised of layers 704. Layers 704 are an example of number of elastomeric layers 226 shown in block form in FIG. 2.

As can be seen in section 705, layers 704 alternate between elastomeric layers and rigid layers. In this example, elastomeric layer 706 is located between rigid layer 708 and second portion 605 of enclosure 600. In particular, elastomeric layer 706 may be associated with inner surface 707 of second portion 605. Second portion 605 may function as a rigid layer and may be considered a rigid layer in this particular example. As another example, elastomeric layer 712 is located between rigid layer 714 and rigid layer 716 in layers 704. Rigid layer 714 is associated with outer surface 717 of socket 604. In other illustrative examples, some portions of layers 704 may not be associated with each other or may not be associated with second portion 605 of enclosure 600, socket 604, or both, depending on the particular implementation.

In this illustrative example, the different layers in layers 704 are associated with each other such that layers 704 do not slide relative to each other. In other words, a layer in layers 704 will not slide across the surface of another layer in layers 704 or separate from other layers in layers 704 in some other manner. Layers within layers 704 may be bonded to each other or secured to one another in some other suitable manner.

Figure 8:
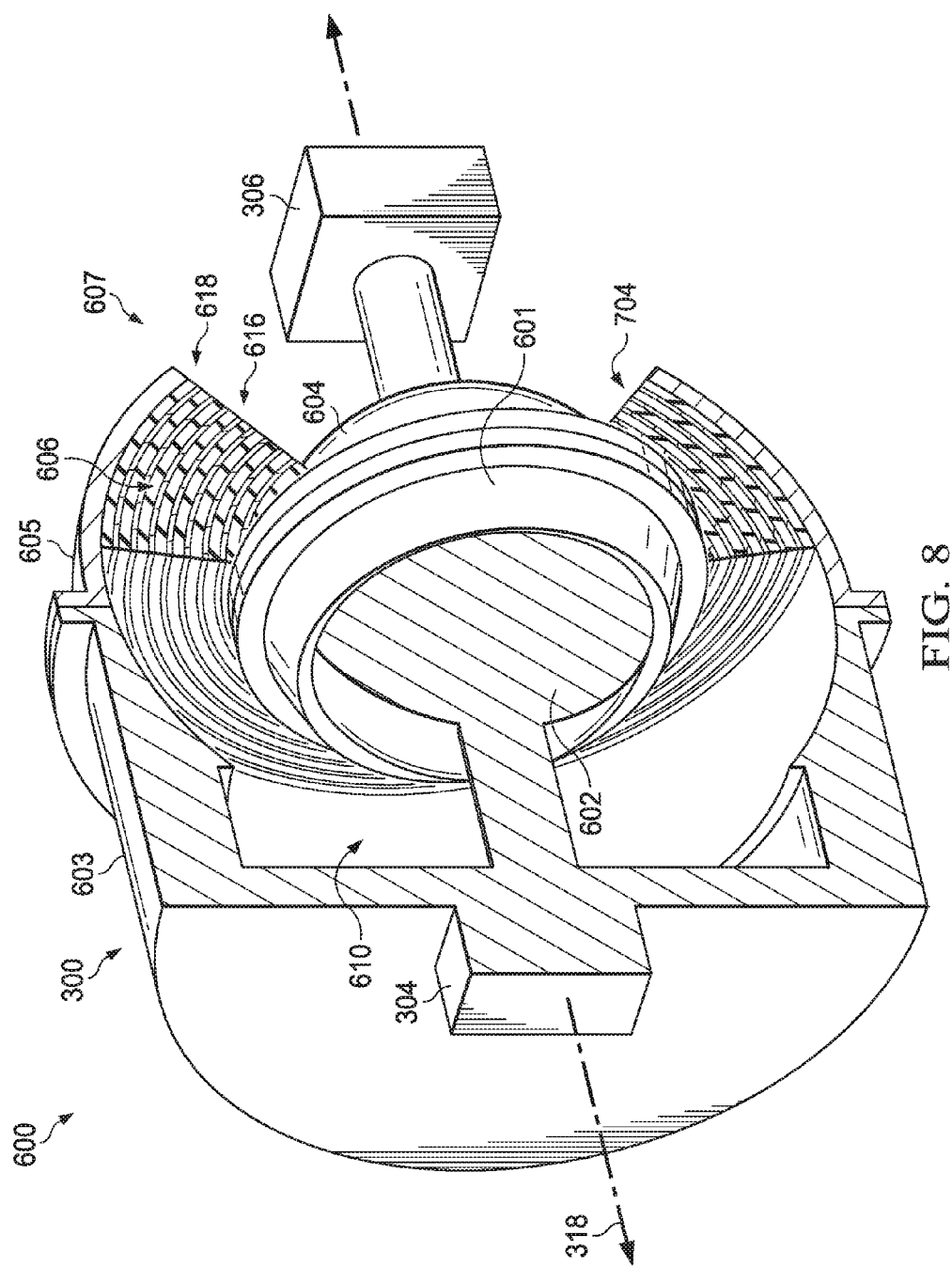
FIG. 8 is an exposed isometric view of a multi-directional joint assembly in accordance with an illustrative configuration.

Turning now to FIG. 8, an exposed isometric view of a multi-directional joint assembly is depicted in accordance with an illustrative configuration. An exposed isometric view of multi-directional joint assembly 300 is shown in a static state. In this state, no bending or torsional forces are applied to multi-directional joint assembly 300.

Figure 9:
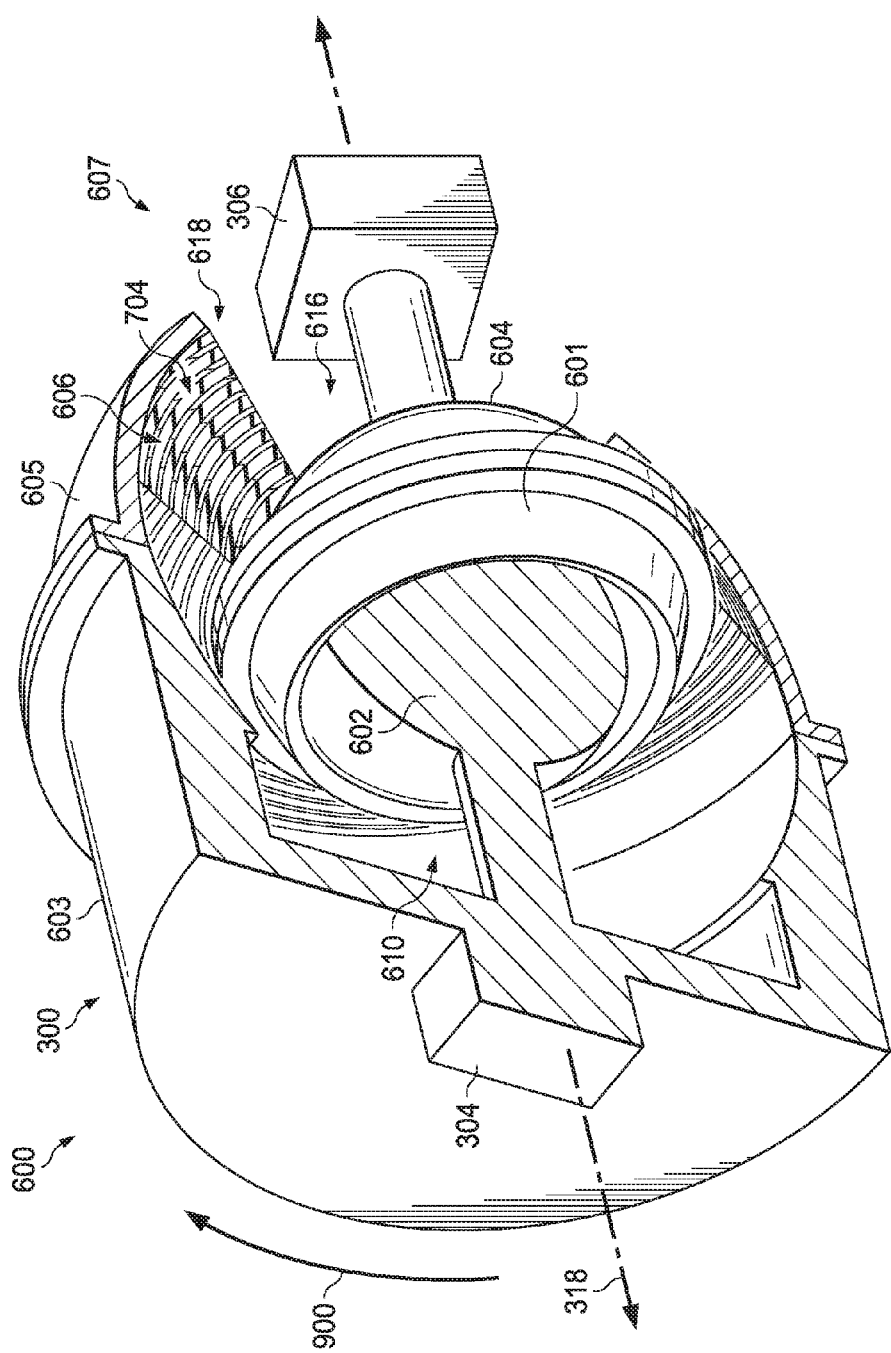
FIG. 9 is an illustration of a torsional force applied to a multi-directional joint assembly in accordance with an illustrative configuration.

In FIG. 9, an illustration of a torsional force applied to a multi-directional joint assembly is depicted in accordance with an illustrative configuration. As depicted, torsional force 900 is applied to multi-directional joint assembly 300. In this example, torsional force 900 is a force in a direction about axis 318 that extends centrally through multi-directional joint assembly 300. Torsional force 900 is applied in a clockwise direction at first end 304 of multi-directional joint assembly 300 in this illustrative example. Torsional force 900 may cause ball 602 to rotate relative to socket 604 about axis 318.

Torsional force 900 is reacted by elastomeric bearing 606. In particular, elastomeric bearing 606 incurs a deflection in rotation that absorbs energy and reduces the torsional load carried between first end 304 and second end 306 of multi-directional joint assembly 300. This load will occur when the first end 304 and second end 306 rotate relative to each other along axis 318. At least a portion of this energy may be converted into heat in this illustrative example.

When torsional force 900 is no longer applied at first end 304, elastomeric bearing 606 may substantially return to the original state as illustrated in FIG. 8. In this manner, elastomeric bearing 606 absorbs energy from torsional force 900 while multi-directional joint assembly 300 remains rigid along axis 318 to maintain a desired relative distance between a first object associated with first end 304 and a second object associated with second end 306 of multi-directional joint assembly 300. In this particular example, energy is not absorbed in other directions such as bending.

Figure 10:
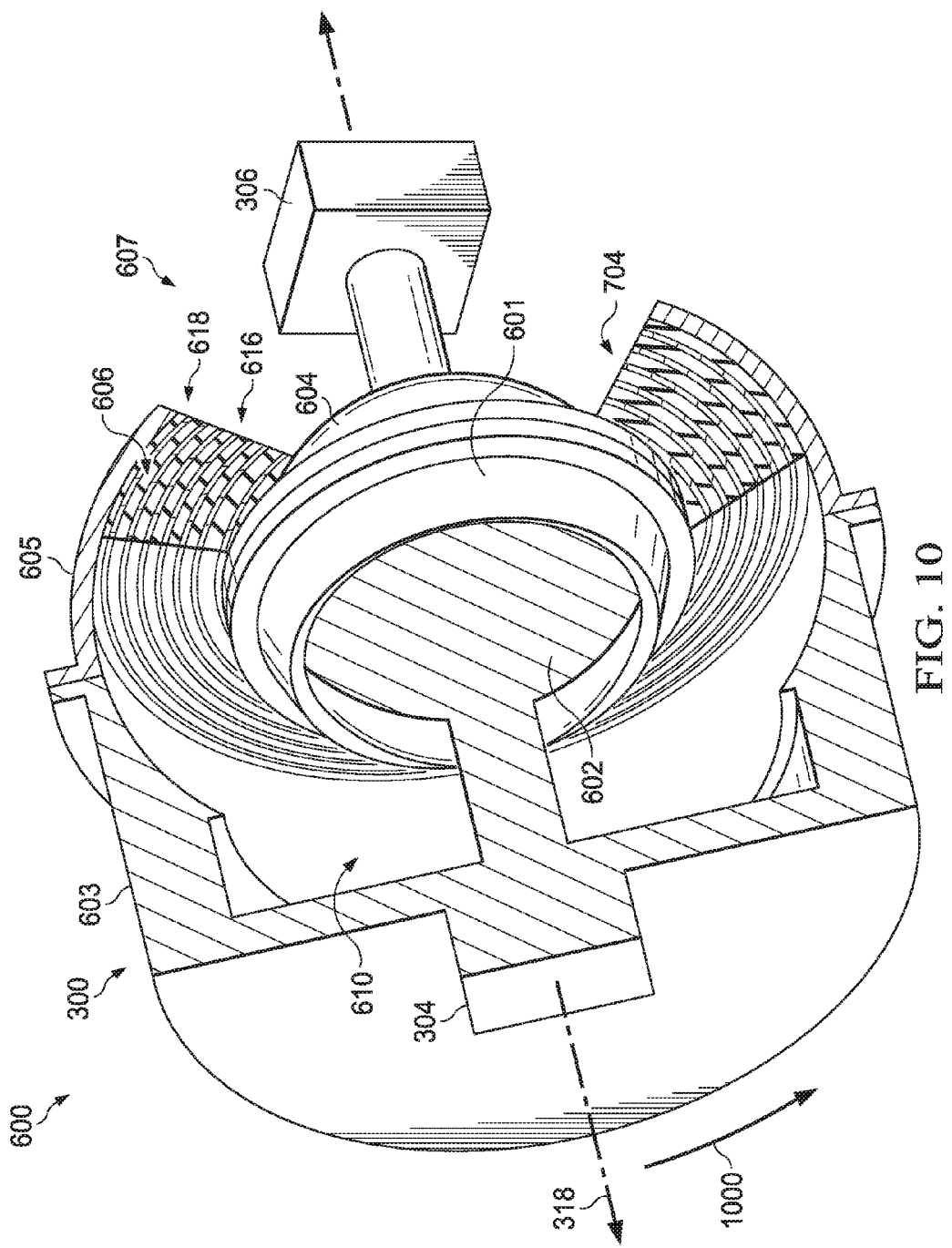
FIG. 10 is another illustration of a torsional force applied to a multi-directional joint assembly in accordance with an illustrative configuration.

With reference next to FIG. 10, another illustration of a torsional force applied to a multi-directional joint assembly is depicted in accordance with an illustrative configuration. In this example, torsional force 1000 is applied at first end 304 of multi-directional joint assembly 300. Torsional force 1000 is applied in an opposite direction to torsional force 900 in FIG. 9. In this depicted example, torsional force 1000 is applied in a counterclockwise direction about axis 318.

The application of torsional force 1000 also may cause a load to be applied on elastomeric bearing 606 that causes elastomeric bearing 606 to deform. This deformation also absorbs energy from the load placed on elastomeric bearing 606 through deformation that results from reacting torsional force 1000. When torsional force 1000 is no longer applied at first end 304, elastomeric bearing 606 may substantially return to its original state as illustrated in FIG. 8.

Figure 11:
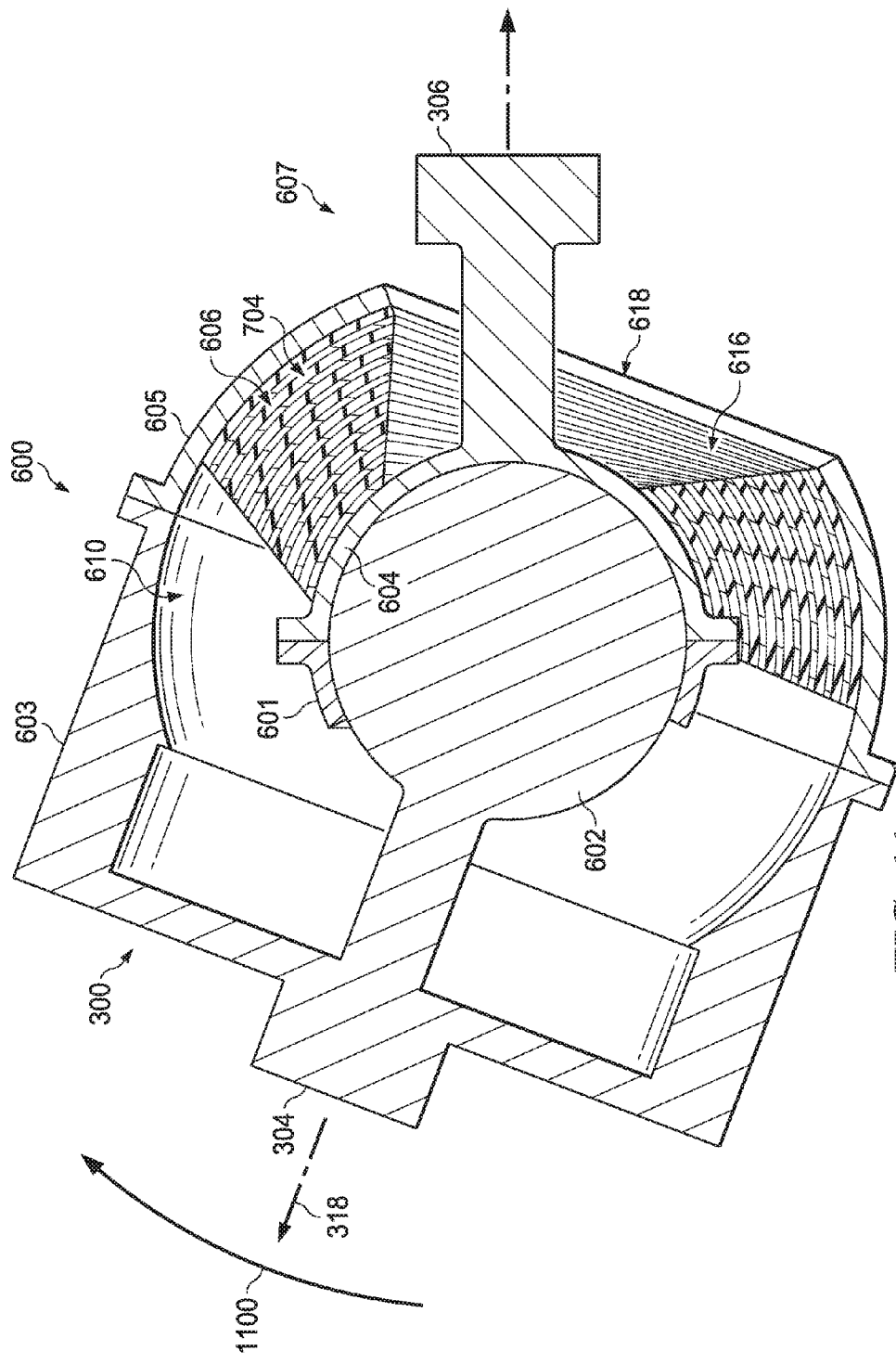
FIG. 11 is an illustration of a cross-sectional view of a bending force applied to a multi-directional joint assembly in accordance with an illustrative configuration.

With reference now to FIG. 11, an illustration of a cross-sectional view of a bending force applied to a multi-directional joint assembly is depicted in accordance with an illustrative configuration. In this cross-sectional view taken along lines 7-7 in FIG. 4, bending force 1100 is applied at first end 304 of multi-directional joint assembly 300. In this illustrative example, bending force 1100 is applied relative to axis 318. In particular, bending force 1100 may be perpendicular to or at some other angle relative to axis 318.

Bending force 1100 results in a load being reacted by elastomeric bearing 606. With a beam type configuration as used in this illustrative example, the bending load component is greater than the normal loads or torsional loads. Reaction of this load causes a deformation of elastomeric bearing 606. This load occurs where first end 304 rotates relative to second end 306 at any axis perpendicular to axis 318. Since the outer surface of elastomeric bearing 606 is attached to second portion 605 of enclosure 600 and the inner surface of elastomeric bearing 606 is attached to socket 604, any bending loads applied to the joint system are reacted by elastomeric bearing 606. Energy from the load causing deformation by means of bending force 1100 may be converted into heat in elastomeric bearing 606.

When bending force 1100 is no longer applied at first end 304, a load is no longer applied to elastomeric bearing 606. As a result, elastomeric bearing 606 may return to substantially its original state as shown in FIG. 8.

Figure 12:
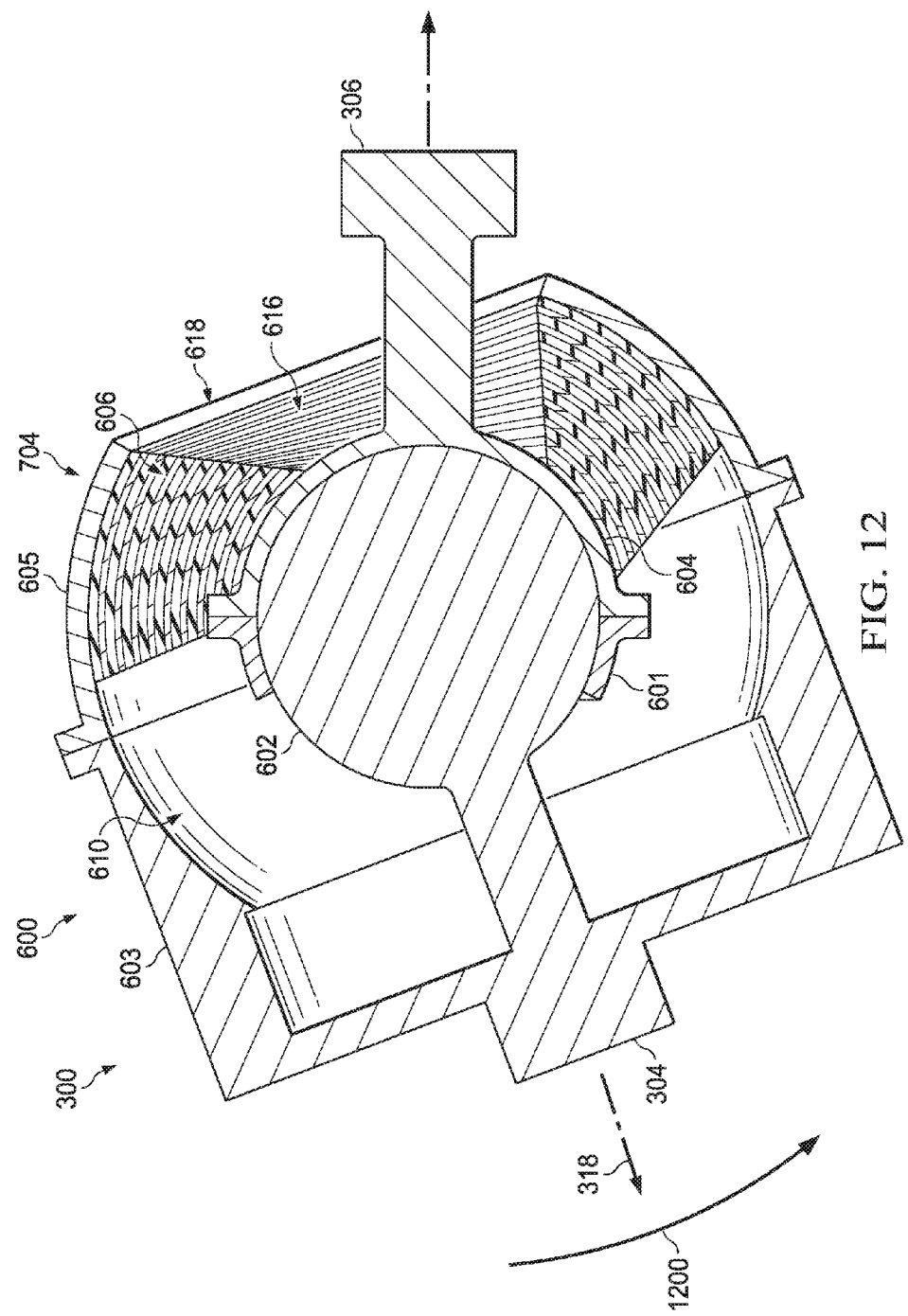
FIG. 12 is another illustration of a cross-sectional view of a bending force applied to a multi-directional joint assembly in accordance with an illustrative configuration.

Next, in FIG. 12, another illustration of a cross-sectional view of a bending force applied to a multi-directional joint assembly is depicted in accordance with an illustrative configuration. In this cross-sectional view taken along lines 7-7 in FIG. 4, bending force 1200 is applied at first end 304. Bending force 1200 is opposite to bending force 1100 in FIG. 11 relative to axis 318.

In these illustrative examples, the application of bending force 1200 applies a load to elastomeric bearing 606 that causes the deformation of elastomeric bearing 606. Energy from bending force 1200 is absorbed by deforming elastomeric bearing 606. Some of this energy may also be converted to heat as a result of deforming elastomeric bearing 606. When bending force 1200 is removed, elastomeric bearing 606 may substantially return to its original state as illustrated in FIG. 8.

Figure 13:
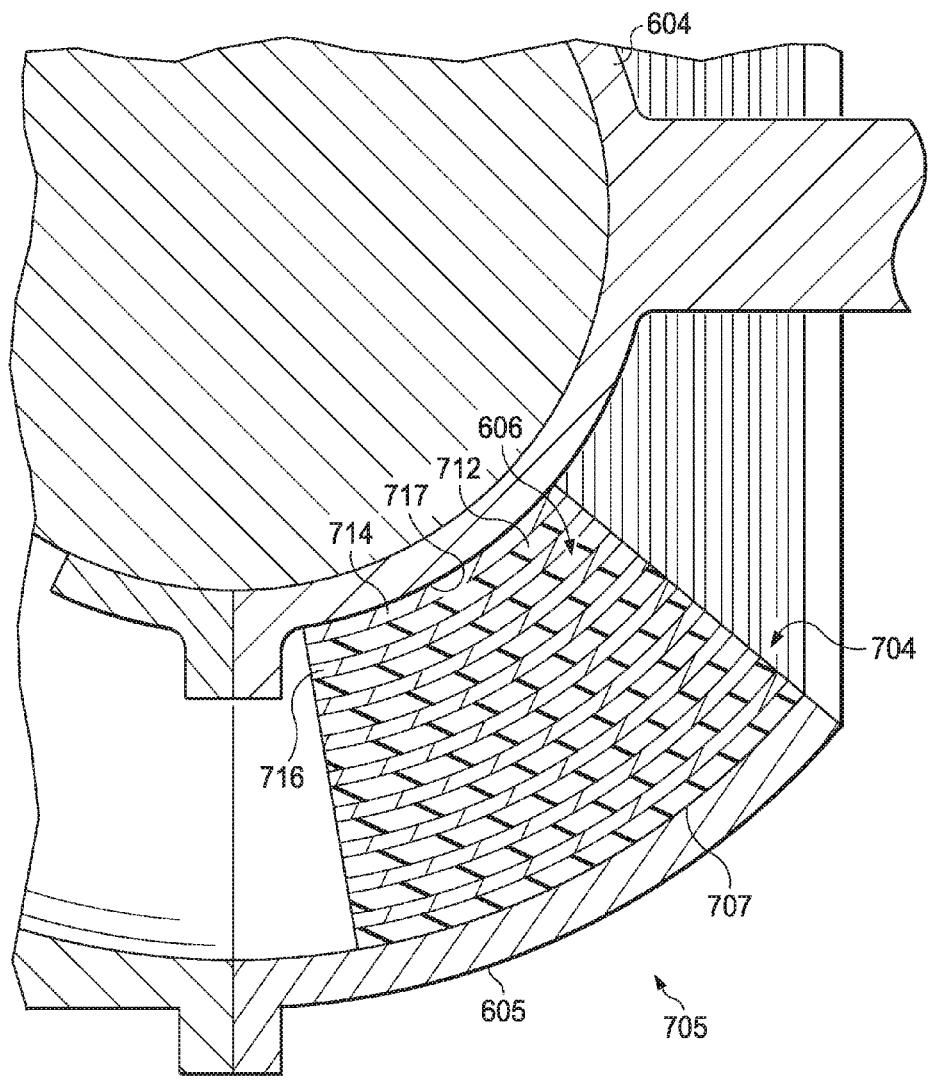
FIG. 13 is a detailed illustration of layers in an elastomeric bearing in accordance with an illustrative configuration.

In FIG. 13, a detailed illustration of layers in an elastomeric bearing is depicted in accordance with an illustrative configuration. A more detailed illustration of layers 704 in section 705 from FIG. 7 is shown. In particular, elastomeric layer 712 is depicted between rigid layer 714 and rigid layer 716. Layers 704 are depicted in an unloaded state.

Figure 14:
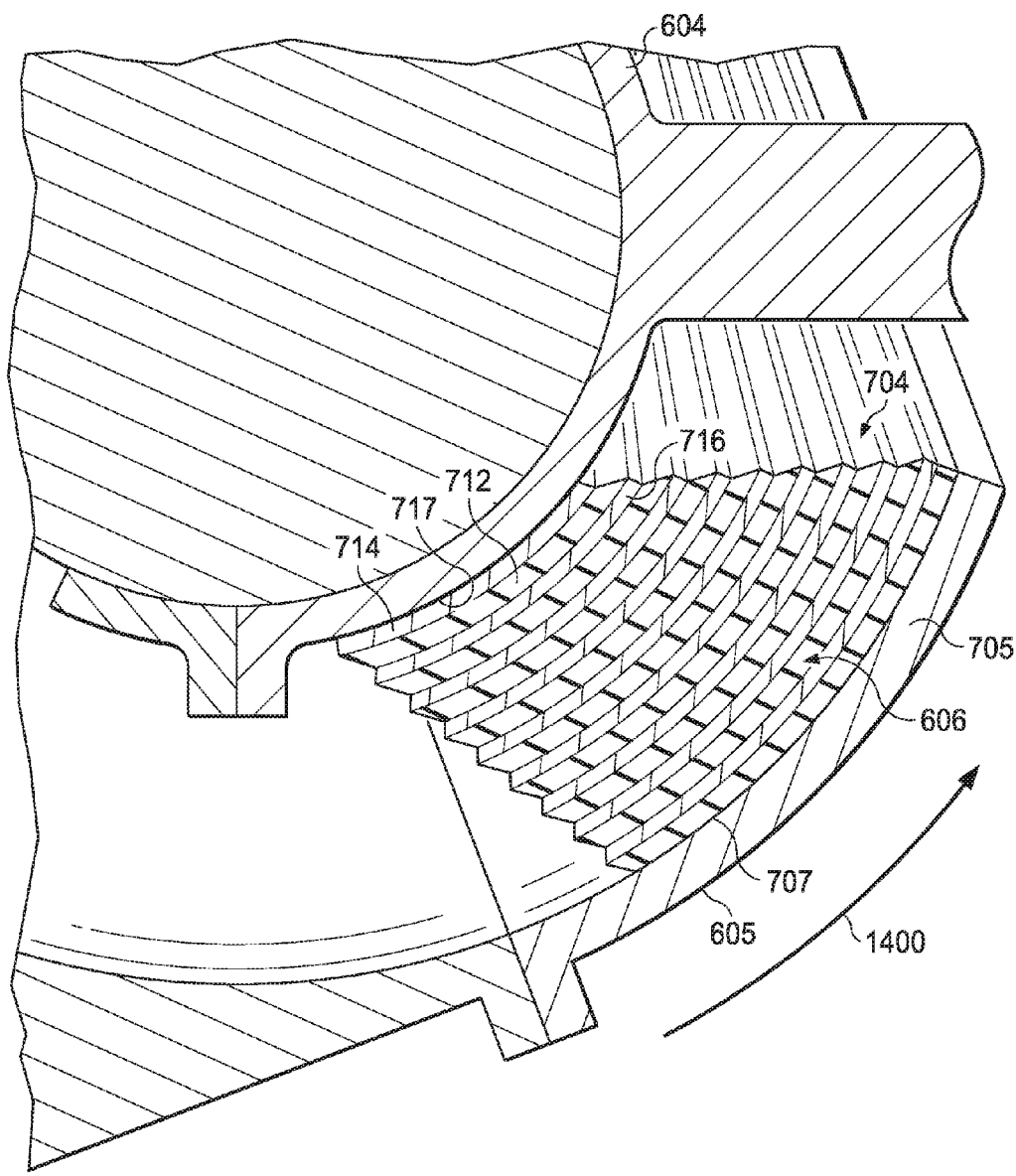
FIG. 14 is an illustration of layers in an elastomeric bearing in a loaded condition in accordance with an illustrative configuration.

With reference next to FIG. 14, an illustration of layers in an elastomeric bearing in a loaded condition is depicted in accordance with an illustrative configuration. As seen in this figure, layers 704 are shown as deformed in response to force 1400 being applied to one end of multi-directional joint assembly 300. Force 1400 causes the load to deform elastomeric layers in layers 704 in elastomeric bearing 606.

As can be seen, the rigid layers in layers 704 within elastomeric bearing 606 have moved relative to each other. This movement is facilitated by deformation of the elastomeric layers in shear reacting to force 1400.

In particular, rigid layer 714 and rigid layer 716 have moved relative to each other because elastomeric layer 712 has deformed in shear. Similarly, the other rigid layers move relative to each other due to deformation in the other elastomeric layers in layers 704. When force 1400 is removed, layers 704 may return to the state as shown in FIG. 13.

In this manner, a first object associated with first end 304 of multi-directional joint assembly 300 and a second object associated with second end 306 of multi-directional joint assembly 300 may move relative to each other. However, this movement is limited by the configuration of layers 704 in elastomeric bearing 606.

The illustration of multi-directional joint assembly 300 in FIGS. 3-14 is provided only for purposes of illustrating one manner in which multi-directional joint 204 shown in block form in FIG. 2 may be implemented. These illustrations of multi-directional joint assembly 300 are not meant to imply limitations to the manner in which different illustrative configurations may be implemented.

For example, although the different elastomeric layers in layers 704 in elastomeric bearing 606 are shown as having the same thickness, other thicknesses may be present such that different layers within the elastomeric layers may have different thicknesses. In a similar fashion, different rigid layers in layers 704 of elastomeric bearing 606 also may have different thicknesses. Further, although 18 layers are shown in layers 704, other numbers of elastomeric layers and rigid layers may be present in elastomeric bearing 606, depending on the desired functionality for elastomeric bearing 606.

The different components shown in FIG. 1 and FIGS. 3-14 may be combined with components in FIG. 2, used with components in FIG. 2, or a combination of the two. Additionally, some of the components in FIG. 1 and FIGS. 3-14 may be illustrative examples of how components shown in block form in FIG. 2 can be implemented as physical structures.

With reference now to FIG. 15, an illustration of flowchart of a process for absorbing a force is depicted in accordance with an illustrative configuration. The process illustrated in FIG. 15 may be implemented in load environment 100 in FIG. 1. In particular, the processes may be implemented using joint system 200 in FIG. 2.

At least one of a number of forces and a number of moments is received in which the number of forces and the number of moments are applied to at least one of a first end and a second end of a multi-directional joint assembly (operation 1500). The first end and the second end move relative to each other in the multi-directional joint assemblies. This movement may occur as a result of forces and/or moments applied to at least one of the first end and the second end. A number of elastomeric layers and a structure in the joint are deformed (operation 1502). The number of elastomeric layers is located in a structure in the multi-directional joint assembly. The number of elastomeric layers is interspersed with a number of rigid layers within the structure.

The process absorbs energy from the at least one of the number of forces and the number of moments through the deformation of the number of elastomeric layers (operation 1504) with the process terminating thereafter. This absorption of energy may be released as heat in these illustrative examples.

With reference now to FIG. 16, another illustration of a flowchart of a process for absorbing a force is depicted in accordance with an illustrative configuration. The process illustrated in FIG. 16 may be implemented in load environment 100 in FIG. 1. In particular, the processes may be implemented using joint system 200 in FIG. 2.

In this example, joint system 200 is used to maintain a fixed distance between a first object and a second object. Further, joint system 200 allows some amount of relative movement between the first object and the second object. The process begins by imposing at least one of forces and moments on the first object that are different than the forces and the moments imposed on the second object (operation 1600). This first object may be first object 210 in FIG. 2 and may be an example of an object such as helicopter 102 in FIG. 1. This second object may be second object 212 in FIG. 2 and may be a beam such as beam 116 in FIG. 1.

A combination of the forces and the moments is applied to the joint system connecting the first object and the second object (operation 1602). In these depicted examples, the difference in forces imposed on the first object and the second object causes a combination of normal, bending, and torsional forces to be applied to the joint system. Further, torsion, a bending moment, or other types of moments may be applied to the joint system. These forces and moments result in a number of loads being applied to the joint system.

As illustrated, the joint system is comprised of a third object that connects the first and second objects. For example, beam 116 may connect helicopter 102 to helicopter 106. In this example, each end of the third object features a multi-directional joint assembly with an elastomeric bearing. In other words, one multi-directional joint assembly connects the first object to the third object and a second multi-directional joint assembly connects the second object to the third object. For example, a first multi-directional joint assembly connects helicopter 102 with beam 116 and a second multi-directional joint assembly connects beam 116 with helicopter 106 in these illustrative examples.

Next, a combination of normal, bending, and torsional loads are induced at the multi-directional joint assemblies between objects (operation 1604). The normal load is reacted rigidly by the multi-directional joint assembly while the bending and torsional loads are reacted by the elastomeric bearing in the joint system such that the elastomeric bearing may deform. In this illustrative example, the combination of normal, bending, and torsional loads may be a result of the displacement of the first object, second object, third object, or some combination thereof. As a result, the normal loads are carried directly into helicopter 102 and helicopter 106 via multi-directional joint assemblies at the ends of beam 116, while the bending and torsional loads are passed through the elastomeric bearings surrounding the multi-directional joint assemblies between these objects.

Next, elastomeric layers in the elastomeric bearing are deformed (operation 1606). In this illustrative example, the bending and torsional loads reacted by the elastomeric bearing cause the deformation in the elastomeric layers. These elastomeric layers may be elastomeric layers within layers 704 of elastomeric bearing 606 in FIG. 7. These elastomeric layers deform in shear and cause the rigid layers within layers 704 to move relative to each other. The elastomeric layers may deform a limited amount in response to the loads applied. For example, the elastomeric layers may be configured such that the first object and the second object may move within five feet of each other.

Energy is then absorbed by the elastomeric layers in the elastomeric bearing (operation 1608). This absorption of energy is caused by the deformation of the elastomeric layers and results in a reduction of the bending and torsional loads carried to the first and second objects. Heat is then released by the elastomeric layers (operation 1610) with the process terminating thereafter. In this example, heat may be released as a result of the deformation of the elastomeric layers. The quantity of heat may vary depending on the material properties and the level of deformation imposed on the elastomeric layers.

The flowcharts and block diagrams in the different depicted configurations illustrate the architecture, functionality, and operation of some possible implementations of apparatuses and methods in an illustrative configuration. In this regard, each block in the flowcharts or block diagrams may represent a module, a segment, a function, and/or a portion of an operation or step.

In some alternative implementations of an illustrative configuration, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Thus, the illustrative configurations provide a method and apparatus for reducing a force in exchange for a deflection. With the use of an illustrative configuration, two objects connected by a multi-directional joint assembly may move relative to each other. However, this movement is limited by the type of multi-directional joint selected and the layer configuration of the elastomeric bearing. As a result, the illustrative configurations provide a stable joint that is rigid to normal forces but still allows movement in bending and torsion of two objects relative to each other within desired tolerances.

Moreover, because bending loads are typically the highest loads reacted by joints that separate objects, the load reduction afforded by the deformation of the elastomeric bearing allows the structural elements at the joint ends to be significantly reduced as compared to other currently used designs. In other words, because the deformation of elastomeric layers within the elastomeric bearing absorb energy from bending and torsional forces, the total force reacted by the first object, second object, and third object becomes much less. As a result, fewer structural elements to carry the same initial load are required. Consequently, the structures required on either side of a joint system connecting two objects may be lighter and smaller.

Thus, with the use of an illustrative configuration, the load within a system is reduced by allowing objects to move relative to each other in certain degrees of freedom as determined by the configuration of the multi-directional joint and damper.

The description of the different illustrative configurations has been presented for purposes of illustration and description, and is not intended to be exhaustive or limited to the configurations in the form disclosed. Many modifications and variations will be apparent to those of ordinary skill in the art.

For example, the illustrative configurations may be implemented for other purposes other than maintaining distance between multiple helicopters in load environment 100. For example, the different illustrative configurations may be applied for use in an automobile, joints for robots, mechanical linkages, or any application in which a controlled amount of relative movement between objects is desired.

Further, different illustrative configurations may provide different features as compared to other illustrative configurations. The configuration or configurations selected are chosen and described in order to best explain the principles of the configurations, the practical application, and to enable others of ordinary skill in the art to understand the disclosure for various configurations with various modifications as are suited to the particular use contemplated.

What is claimed is:

1. A method for reducing a force, the method comprising: receiving at least one of a number of forces and a number of moments applied to at least one of a first end and a second end of a multi-directional joint assembly, wherein the first end and the second end move relative to each other, and wherein the second end is connected to a rotorcraft; and deforming a number of elastomeric layers in a damper associated with the multi-directional joint assembly, wherein the damper comprises the number of elastomeric layers and a number of rigid layers interspersed with each other;
wherein the first end comprises a ball connected to a first elongate member and a first portion of an enclosure of the multi-directional joint assembly, the method further comprising: holding the ball within an interior of the enclosure; and
wherein the second end comprises a hemispherical socket connected to a second elongate member and extending through a hole in a second portion, the method further comprising: pivotally holding the ball within the hemispherical socket by a frusto-spherical ring directly connected to the hemispherical socket.

2. The method of claim 1 further comprising:
absorbing energy from the at least one of the number of forces and the number of moments through the deformation of the number of elastomeric layers in the damper.

3. The method of claim 1, wherein the number of forces is selected from at least one of a normal force, a torsional force, and a bending force, and wherein the number of moments is selected from one of torsion and a bending moment.

4. The method of claim 1, wherein the damper is an elastomeric bearing.

5. The method of claim 1, wherein the number of elastomeric layers is comprised of a number of materials selected from at least one of neoprene, a thermoplastic elastomer, synthetic polyisoprene, polybutadiene, ethylene-vinyl acetate, and chlorosulfonated polyethylene.

6. The method of claim 1, wherein the number of rigid layers is selected from at least one of a metal and a plastic.

7. A method for attaching a beam to a rotorcraft, the method comprising connecting a first end of a multi-directional joint assembly to the beam; connecting a second end of the multi-directional joint assembly to a rotorcraft; pivotally connecting the first end to the second end; and deforming a damper disposed in the multi-directional joint assembly in response to a number of forces and a number of moments applied to at least one of the first end and the second end, wherein the damper is comprised of a number of elastomeric layers and a number of rigid layers interspersed with each other;
wherein the first end comprises a ball distally connected to the beam by a first elongate member and a first portion of an enclosure of the multi-directional joint assembly; and
wherein the second end comprises a hemispherical socket distally connected to the rotorcraft by a second elongate member and extending through a hole in a second portion of the enclosure.

8. The method of claim 7, wherein pivotally connecting the first end to the second end further comprises:
pivotally holding the ball within the hemispherical socket in an interior of the enclosure by a frusto-spherical ring directly connected to the hemispherical socket.

9. The method of claim 8, wherein the damper is comprised of the number of elastomeric layers and a number of rigid layers interspersed with each other and disposed between the hemispherical socket and the second portion, and wherein deforming the damper further comprises:
deforming the number of elastomeric layers to absorb energy from at least one of the number of forces and the number of moments applied to at least one of the first end and the second end.

10. The method of claim 9, wherein the number of elastomeric layers is comprised of a number of materials selected from the group consisting of neoprene, a thermoplastic elastomer, synthetic polyisoprene, polybutadiene, ethylene-vinyl acetate, and chlorosulfonated polyethylene.

11. The method of claim 9, wherein the number of rigid layers is selected from at least one of a metal and a plastic.

12. The method of claim 9, wherein the number of forces is selected from at least one of a normal force, a torsional force, and a bending force, and wherein the number of moments is selected from one of torsion and a bending moment.

13. The method of claim 9, wherein the damper is directly connected to the enclosure and the hemispherical socket and is indirectly connected to the ball by the enclosure.

14. A method for maintaining spacing between a plurality of rotorcraft, the method comprising:
connecting a spacing structure to a first rotorcraft via a first multi-directional joint assembly; and
connecting a first end of the spacing structure to a second rotorcraft via a second multi-directional joint assembly;
wherein each of the first multi-directional joint assembly and the second multi-directional joint assembly comprises:
a first end of a multi-directional joint assembly connected to the spacing structure;
a second end of the multi-directional joint assembly connected to an associated rotorcraft; and
a damper disposed within an associated enclosure of the multi-directional joint assembly and between a hemispherical socket of the second end and a second portion of the associated enclosure, wherein the damper is comprised of a number of elastomeric layers and a number of rigid layers interspersed with each other.

15. The method of claim 14, further comprising:
deforming the damper of the first multi-directional joint assembly in response to a number of forces and a number of moments applied to at least one of the first end and the second end of the first multi-directional joint assembly; and
deforming the damper of the second multi-directional joint assembly in response to the number of forces and the number of moments applied to at least one of the first end and the second end of the second multi-directional joint assembly.

16. The method of claim 15 wherein the first end of the first multi-directional joint assembly and the first end of the second multi-directional joint assembly each comprises a ball distally connected to the spacing structure by a first elongate member and a first portion of the associated enclosure.

17. The method of claim 16, wherein the second end of the first multi-directional joint assembly and the second end of the second multi-directional joint assembly each comprises the hemispherical socket distally connected to the associated rotorcraft by a second elongate member and extending through a hole in the second portion of the associated enclosure.

18. The method of claim 17, further comprising:
pivotally holding the ball within the hemispherical socket in an interior of the associated enclosure by a frusto-spherical ring directly connected to the hemispherical socket to connect the first end of an associated multi-directional joint assembly to the second end of the associated multi-directional joint assembly.

19. The method of claim 18, wherein each damper is comprised of the number of elastomeric layers and a number of rigid layers interspersed with each other and disposed between the hemispherical socket and the second portion of the associated multi-directional joint assembly, and wherein deforming the damper further comprises:
deforming the number of elastomeric layers to absorb energy from at least one of the number of forces and the number of moments applied to at least one of the first end and the second end.

20. The method of claim 19, wherein the number of elastomeric layers is comprised of a number of materials selected from the group consisting of neoprene, a thermoplastic elastomer, synthetic polyisoprene, polybutadiene, ethylene-vinyl acetate, and chlorosulfonated polyethylene.

21. The method of claim 19, wherein the number of rigid layers is selected from at least one of a metal and a plastic.

* * * * *